United States Patent [19]
Kober

[11] 4,083,268
[45] Apr. 11, 1978

[54] ELECTRICAL WIRE DISPENSER WITH CUTTER AND STRIPPER

[75] Inventor: Marvin Kober, Spring Valley, N.Y.

[73] Assignee: O.K. Machine and Tool Corporation, New York, N.Y.

[21] Appl. No.: 752,726

[22] Filed: Dec. 21, 1976

[51] Int. Cl.² .............................................. H02G 1/12
[52] U.S. Cl. ................................... 81/9.5 R; 30/124; 7/107
[58] Field of Search ................... 81/9.51, 9.5 R, 9.5 C; 30/127, 124; 7/14.1 R; 242/138, 137, 137.1, 129; 83/924

[56] References Cited

U.S. PATENT DOCUMENTS

| 1,987,959 | 1/1935 | Knuuti et al. | 81/9.51 |
| 2,848,914 | 8/1958 | Gottfried | 7/14.1 R |
| 2,965,331 | 12/1960 | Nagy | 242/138 |
| 3,096,951 | 7/1963 | Jenson | 242/137.1 |
| 3,114,277 | 12/1963 | Clendenin | 7/14.1 R |
| 3,636,798 | 1/1972 | Van Dalen et al. | 7/14.1 R |
| 3,857,306 | 12/1974 | Gudmestad | 81/9.51 |

FOREIGN PATENT DOCUMENTS 694,583 7/1953 United Kingdom ............... 7/14.1 R

Primary Examiner—James L. Jones, Jr.

[57] ABSTRACT

An electrical wire dispenser with built-in wire cutter and insulation stripper comprises a housing for a spool of wire, and an outlet on the housing through which the free wire end can be drawn. A groove is provided on a surface of the housing, and the wire cutter and stripper are mounted in spaced relationship along the groove to perform their respective functions on the wire when positioned within the groove.

14 Claims, 7 Drawing Figures

ELECTRICAL WIRE DISPENSER WITH CUTTER AND STRIPPER

This invention relates to electrical wire dispensers incorporating a wire cutter and an insulation stripper for the cut wire end.

The electronic and telephone industries employ fine insulated wires for interconnecting electronic and telephone components and equipment. Typical wire sizes are AWG Nos. 22-30. The operator selects a desired wire size usually from a spool of wire, cuts it to the desired length, and then strips the insulation from the wire ends preparatory to making the desired connection, usually by soldering, wire-wrapping, or mechanical insertion into component or equipment terminals. Separate hand tools are available for effecting the wire cutting and insulation stripping of the wire ends.

The principal object of the invention is an electrical wire dispenser incorporating a wire cutter and an insulation stripper for the dispensed wire.

Another object of the invention is a dispenser with built-in cutter and stripper that is capable of low-cost manufacture.

This and other objects and advantages of the invention are achieved, briefly speaking, with a dispenser comprising a separable housing for receiving and supporting a spool of wire and provided with an opening through which the wire can be drawn off the spool. The housing contains a groove along one surface through which the wire can be drawn. Spaced along the groove are means for cutting the wire and means for stripping the insulation off the cut wire end.

In a preferred embodiment, the wire cutter comprises a spring-loaded plunger mounted for movement across the groove and adapted with its end to press the wire when held in the groove against a sharp edge to cut same. The insulation stripper comprises a bifurcated element forming a stripping slot located in the groove and adapted when the wire is pushed or pulled therein to cut through opposed sides of the insulation, such that when the free wire is pulled through the stripper, the insulation is stripped from the cut wire end.

The invention will now be described in greater detail with reference to the accompanying drawings wherein.

Figure 1:
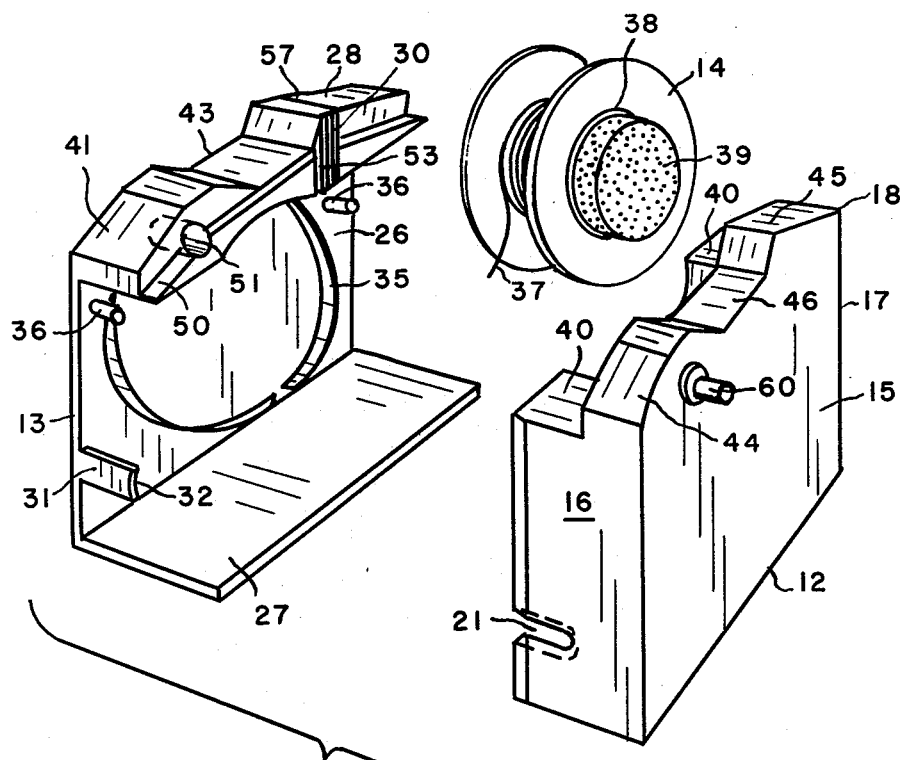
FIG. 1 is an exploded, perspective view of one form of electrical wire dispenser in accordance with the invention.

The drawings illustrate one form of electrical wire dispenser with built-in wire cutter and insulation stripper in accordance with the invention. The dispenser, indicated generally at 10 in FIG. 2, comprises a housing 11 of suitable material, for example, plastic or metal. A preferred material is clear polystyrene which will enable the user to see into the housing interior. The housing 11 is preferably constituted of two generally U-shaped halves, see FIG. 1, a right half 12 and a left half 13, adapted when fitted together to form a unitary housing 11 for receiving a spool 14 of electrical wire. The right half 12 comprises a side wall 15, front and rear walls 16, 17, and a top wall 18. The side wall 15 is provided with a recess 20 sized to receive the spool 14. Its front wall 16 has a slot 21, part of which will form an opening through which the spool wire can be withdrawn from the dispenser.

Figures 2, 3:
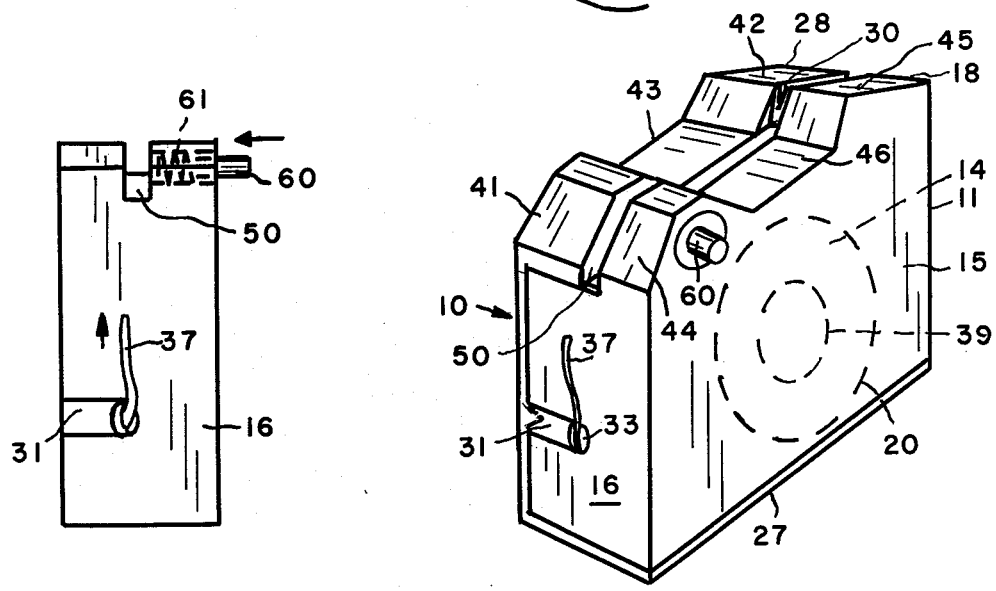
FIG. 2 is a perspective view of the assembled dispenser shown in FIG. 1.
FIGS. 3 and 4 are end and top plan views, respectively, of the dispenser of FIG. 2.

The left half 13 of the housing comprises a side wall 26, a bottom wall 27, and a top wall 28. A wire cutter 30 is mounted at the top wall 28. Projecting from the left half 13 is a tab 31 having a concave end 32. The tab 31 is configured to fit within the slot 21 of the right half 12, but terminates short of the slot end forming with the latter a round opening 33 in the end wall of the assembled housing halves as shown in FIG. 2. The side wall 26 of the left half 13 is also provided with a recess 35 for receiving the spool 14. Pins 36 are also provided on the side wall 26 for engagement with blind holes (not shown) in the facing side wall 15 of the right half 12 to facilitate assembly. The pins 36 are sized for a press fit into the blind holes to retain the assembled halves. Before assembly, the spool 14 of electrical wire is positioned between the two halves, the free wire end 37 placed in the slot 21, and the two halves joined together. The spool 14 is loosely held within the assembled halves enabling rotation of the spool as the wire end, designated 37 in FIG. 2, is drawn off the spool through the opening 33. To avoid undue rattling of the spool, and restrict its rotation, a resilient foam plastic cylinder 39 is located within the spool center 38. When the foam plastic 39 is pressed by the assembled halves, it expands against the spool center 38 providing the small frictional restraining force desired. The housing halves can be held together by the press-fitted pins 36, allowing separation for replacement with a fresh spool of wire, or glued, as desired. In the latter case, the dispenser would be disposable when the wire supply is exhausted.

As will be observed from FIG. 2, in the assembled unit, the bottom wall is formed by the bottom ledge 27 of the left half, the side walls are formed by the side walls 15 and 26, the front wall by front wall 16 of right half 12, and the rear wall by rear wall 17 of the right half 12. The right half 12 has at its top spaced ledge portions 40 adapted to fit under the top wall 28 of the left half 13. The top wall 28 has a front upwardly tapered portion 41, and a rear downwardly tapered portion 42 separated by a recessed area 43 from the front portion. The upper wall of the right half 12 has similarly configured front 44 and rear 45 portions also separated by a groove 46 aligned with the groove 43. The left half 13 also has a concave-downward ledge 50 which in the assembled unit forms a groove located in the top surface and sized to receive the wire 37. In the groove 50 portion nearest the wire outlet 33 is located a horizontal hole or bore 51. Spaced along the groove from the bore 51 is the wire stripper 30.

Figure 7:
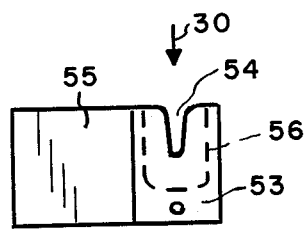
FIG. 7 is a detail plan view of the stripper and its mounting block.

The wire stripper 30, in a preferred embodiment, comprises a thin plate 53, of hardened spring metal, provided with a stripping slot 54 opening at the top. See FIG. 7. The slot width, where the sides are parallel, is chosen so that when the wire 37 is pushed or pulled into the slot 54, the plate edges cut through the insulation but not the metal wire, so that when the wire is pulled through the slot 54, to the right in FIG. 2, the insulation will be stripped from the wire end. The stripper plate 53 is mounted, as by gluing, to a backing member 55 having a recessed area 56, and this sub-assembly then simply mounted in a slot 57 machined at the top of the left half 13. It may be secured therein by a press fit or gluing. The parts are positioned so that the stripping slot 54 is located centrally of the groove 50.

Figure 4:
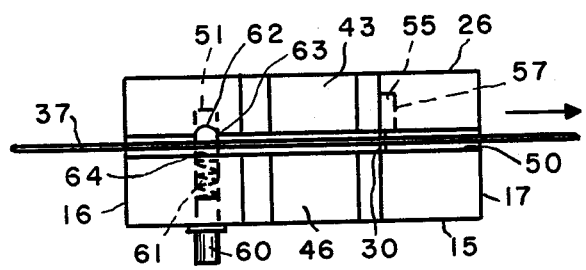

A plunger or piston 60 is mounted in the right half 12. See FIGS. 3-5. The plunger 60 is adapted to move transverse to and across the groove 50 and is sized to be received by the bore 51. A compression spring 61 provides a restoring force on the plunger 61. The end 64 of the plunger may be flat. The top of the bore opening 51 is cut away 62 to form an edge 63. When the wire 37 is drawn off the spool 14 and pulled through the groove 50, it lies between the plunger end 64 and the bore 51, as illustrated in FIG. 4. When the plunger 60 is depressed, shown in FIG. 5, the wire is forced by the plunger end 64 against the sharp edge 63 and severed. Notwithstanding that the plunger 60 and sharp edge 63 may be of plastic, the thin electronic wires are readily severed without wearing of the edge 63.

Figure 6:
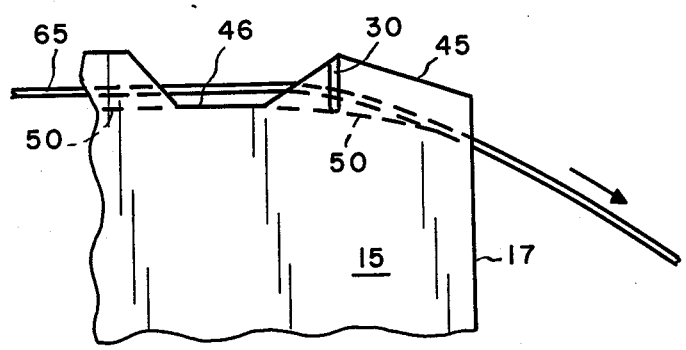
FIG. 6 is a fragmentary side view of the front of the dispenser of FIG. 2 showing passage of the wire through the groove.

Following severing of the wire end, the severed wire, designated 65, is pulled downward, to the right of FIG. 6, into the stripping slot 54 until the slot bottom is reached. Then, continued pulling of the wire to the right in FIG. 6 will strip off the insulation between the severed end of the wire and the wire portion initially placed in the stripper 30.

As will be observed, the curved or rounded slot 50 which guides the wire during the cutting and stripping operations assists in its desired motion, which is upward from the front side 16, over and into the groove 50, and then downward on the rear side 17. The construction of the stripper entailing mounting of the thin plate 53 on the backing member 55 in turn mounted in the slot 57 provides adequate strength for supporting the stripper against the pulling forces exerted on the wire. The recesses 43, 46 on top enable ready viewing of the wire position during the performed operations and facilitates same. By constructing the housing of clear plastic, it will be apparent how much wire remains on the spool, which is readily observed through the single thickness bottom wall 27. It will be further evident that a very compact, sturdy construction is present, readily fabricated at low cost, and capable of simple, efficient, and rapid production of desired lengths of insulated wires with a stripped end.

Figure 5:
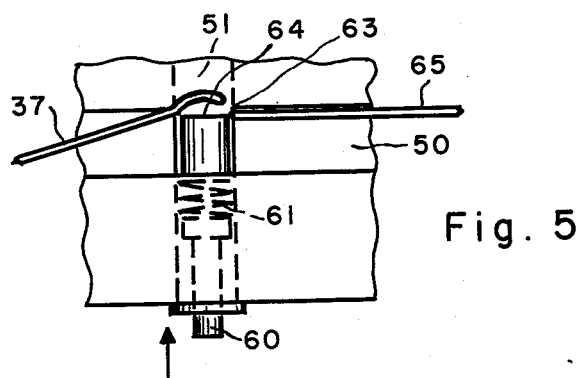
FIG. 5 is an enlarged fragmentary detail view corresponding to FIG. 4 illustrating operation of the wire cutter.

As mentioned, the plunger 60 and sharp edge 63, both of plastic, are used to cut the wire. The mounting of the plunger 60 as shown in FIG. 5 is such that it can be rotated. Should the plunger edge portion adjacent the edge 63 wear, the plunger 60 can be rotated to provide a fresh unworn edge for the cutting function, which prolongs the life of the dispenser. As also mentioned, the distance between the cutter and stripper can be chosen to provide a desired length of bare wire needed when the wire connection is made, for example, by wire-wrapping. Thus, for AWG #26, 28 or 30 wire on the spool, a one inch distance is chosen, which will enable 7-9 coils to be made by wire-wrapping. For AWG #24 or 22, the distance chosen is 1 7/16 inches.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A wire dispenser comprising a housing, a supply of insulated wire within the housing, means on the housing for severing a portion of the wire withdrawn from the supply, and means on the housing for stripping off the insulation from the severed wire end, said housing having a wire-receiving groove extending along one surface of the housing, said severing means and stripping means being mounted in spaced relationship along the said wire-receiving groove.

2. A wire dispenser as claimed in claim 1 wherein the supply of wire is a spool of wire, and the housing has an outlet for the wire on another of its surfaces.

3. A wire dispenser as claimed in claim 2 wherein the housing is constructed in two halves, and the outlet is formed by a projecting tab on a first half engaging a slot in the second half.

4. A wire dispenser as claimed in claim 3 wherein both housing halves are generally U-shaped.

5. A wire dispenser as claimed in claim 1 wherein the severing means comprises a plunger constructed to move transverse to the groove and form with a sharp edge on the housing the means for severing the wire.

6. A wire dispenser as claimed in claim 5 wherein the stripper comprises a bifurcated plate forming a stripping slot positioned transverse to and within the groove.

7. A wire dispenser as claimed in claim 6 wherein the groove is rounded and the housing has a recessed region located between the severing means and stripping means.

8. A wire dispenser as claimed in claim 6 wherein a backing plate supports the bifurcated plate in the groove.

9. A wire dispenser as claimed in claim 2 wherein the housing is constructed of a transparent material, and a mass of resilient material is located within the spool and engages the housing walls to restrain spool rotation.

10. A wire dispenser as claimed in claim 5 wherein the plunger and sharp edge are both formed of plastic material.

11. A wire dispenser as claimed in claim 10 wherein the plunger is rotatable.

12. A wire dispenser as claimed in claim 1 wherein the spacing between the severing means and stripping means is such as to produce a preselected length of bare wire end.

13. A wire dispenser comprising a housing, a spool of insulated electrical wire mounted for rotation within the housing, means providing a path for the wire to follow when a free end of the wire is withdrawn from the spool to a point external of the housing, means mounted on the housing along the said wire path for severing a portion of the wire lying along the path, and means mounted on the housing along the said wire path spaced from and downstream of the severing means for stripping off the insulation from the severed wire end when the free wire end is pulled along the said path.

14. A wire dispenser as claimed in claim 13 wherein the spacing between the severing means and the stripping means along the said path determines the length of insulation stripped from the wire end.

* * * * *